UNITED STATES PATENT OFFICE.

GEORGE W. WODICKA, OF ST. LOUIS, MISSOURI.

WALL-FINISH AND PROCESS OF MAKING SAME.

SPECIFICATION forming part of Letters Patent No. 709,188, dated September 16, 1902.

Application filed April 28, 1902. Serial No. 105,006. (No specimens.)

*To all whom it may concern:*

Be it known that I, GEORGE W. WODICKA, a citizen of the United States, residing at St. Louis, in the State of Missouri, have invented new and useful Improvements in Wall-Finishes and Processes of Making the Same, of which the following is a specification.

My composition is a lusterless non-peeling wall-finish; and it consists of the following ingredients, combined in the proportions stated—viz., water, substantially pure, forty-two gallons; gum-tragacanth, four pounds; alum, twenty pounds; glue, eighty pounds; pure raw pulverized marble, two thousand pounds.

To combine and mix the above ingredients, thus forming the new composition, the following process is employed: The tragacanth is placed in water, there being approximately three quarts of water for each ounce of tragacanth. This is allowed to soak for twenty-four hours, then boiled for one hour, then run through sieves to extract any undissolved portion. This solution is then mixed with the pure raw pulverized marble. The whole product is then dried and pulverized to the fineness of flour, after which the specified quantities of alum and glue are added. The analysis of the compound mixture would then be the condensed hydrogen and oxygen of forty-two gallons of pure, preferably evaporated, water, two thousand pounds of pure raw pulverized marble, twenty pounds of alum, eighty pounds of glue, and four pounds of gum-tragacanth.

The proportions above given should be followed, as any deviation from the above proportions or the substitution of other ingredients for either of the first four mentioned in the above composition will have a deleterious effect. Pure raw pulverized limestone may be substituted in whole or in part for pure raw pulverized marble as its equivalent.

The best calcimines now known and in use or on the market are composed of a mixture of china-clay, carbonates of lime or gypsum, better known as "plaster-of-paris," or some similar base, with Irish or Iceland moss, and alum and glue. China-clay, plaster-of-paris, and lime all having gone through a burning process in the course of their production or manufacture have a tendency to fade colors and to produce streaks and clouds therein. The inherent heat retained in these substances in course of time destroys or injures the adhesive qualities of the glue, and Irish and Iceland moss lose their strength and decompose. By the use of pure raw pulverized marble or limestone in my composition I am enabled to fully retain any color or tint free from streaks or clouds.

In using my composition the material produced by the above-described process is blended in boiling water in proportion of a pint of water to each pound of material and is agitated until the process of solution is complete. The initial coat to a new or porous wall should be applied freely but evenly in a warm state in order to insure perfect adhesion. All subsequent coats must be applied cold, and when found too heavy should be thinned out by the addition of cold water.

Having thus described my invention, what I claim as new, and desire to secure by Letters Patent, is—

1. The process of manufacturing a lusterless non-peeling wall-finish which consists of the following steps: soaking four pounds of gum-tragacanth in water for twenty-four hours, then boiling the same for one hour, straining the resultant solution, mixing it with two thousand pounds of pure raw pulverized marble, drying and pulverizing the mixture thus formed, and adding alum and glue in the proportions specified, substantially as and for the purposes set forth.

2. A composition of matter constituting an improved wall-finish, consisting of the following materials in substantially the described proportions, by weight: pure raw pulverized marble, two thousand parts; gum-tragacanth, four parts; glue, eighty parts; and alum twenty parts.

In testimony whereof I have hereunto set my hand in presence of two subscribing witnesses.

GEORGE W. WODICKA.

Witnesses:
HENRY SCHROEDER,
FRED BRINKMEYER.